UNITED STATES PATENT OFFICE.

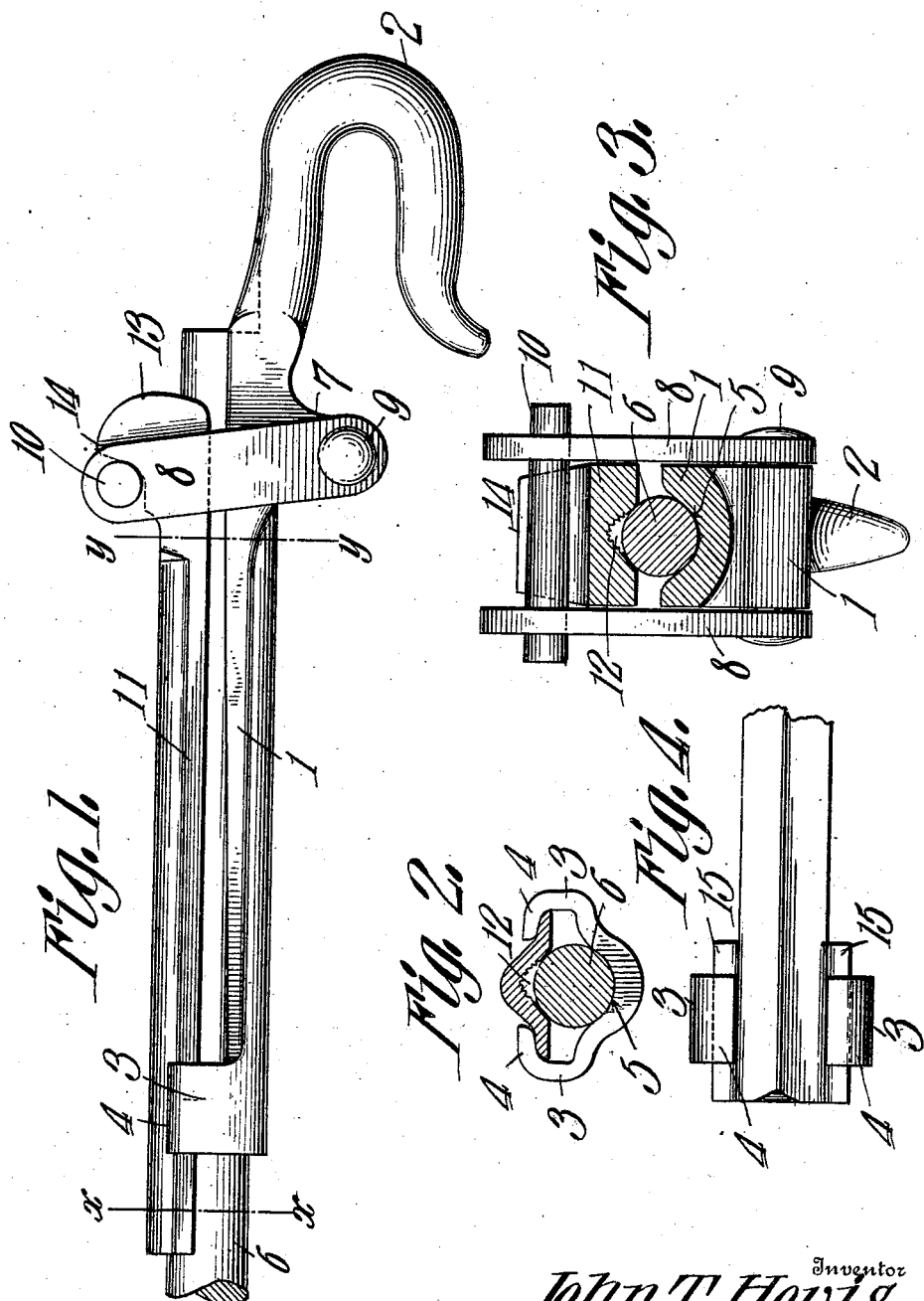

JOHN THEODORE HOVIS, OF CLINTONVILLE, PENNSYLVANIA.

CLAMP FOR MOTION-RODS FOR OIL-WELLS.

No. 876,966.    Specification of Letters Patent.    Patented Jan. 21, 1908.

Application filed September 30, 1907. Serial No. 395,272.

*To all whom it may concern:*

Be it known that I, JOHN THEODORE HOVIS, a citizen of the United States, residing at Clintonville, in the county of Venango and State of Pennsylvania, have invented new and useful Clamp for Motion-Rods of Oil-Wells, of which the following is a specification.

This invention has reference to improvements in clamps for motion rods of oil wells, and it is designed to produce a clamp which will firmly grip and hold round iron rods such as are used in oil wells, for coupling up such rods or for lifting broken rods.
The invention consists essentially of a clamp member having a longitudinal rounded groove, said member being formed at one end with a hook and at the other end with overhung projecting flanges and also carrying a pivoted yoke, while coacting with this clamp member is another clamp member having a matching V groove, the said second clamp member being provided with a head engaged by the pivoted yoke and having projecting ears arranged to engage under the flanges on the other member so that the second member may be held in parallelism with the first member and at the same time be brought into clamping relation with a rod inserted between the two members and into the V grooves so as to firmly hold the same and as strain is put upon the rod be brought into closer or more firm clamping relation to said rod.
The invention will be best understood from the following detailed description, taken in connection with the accompanying drawings forming part of this specification, in which,—
Figure 1 is a side elevation of the improved clamp; Fig. 2 is a cross section on the line x—x of Fig. 1; Fig. 3 is a cross section on the line y—y of Fig. 1; and Fig. 4 is a plan view of that end of the clamp remote from the hook.

Referring to the drawings, there is shown a clamp member 1 in the form of an elongated bar terminating at one end in a hook 2 and at the other end in upturned flanges 3 having overhanging approaching lips 4 spaced a distance from the body 1. Extending longitudinally throughout the length of the body portion on the side opposite that from which the hook projects is a rounded groove 5 which will receive so as to firmly engage a rod 6 which may represent an iron motion rod of an oil well. These rods are not always the same size and may vary considerably but the V groove 5 will engage rods of different diameters even though such diameters may vary to a considerable extent. Near the hook end of the body 1 and on the same side as the hook is a laterally projecting lug 7 to which are pivoted two flat links 8—8, one on one side of the body and the other on the other side, a pivot bolt 9 securing these links to said lug. The other end of each link is provided with an eye for the passage of a pin 10 which may be slightly tapered so that when driven through the eyes it will frictionally engage one of them sufficiently to hold the pin in place but at the same time by driving the pin in the opposite direction it may be easily displaced from the eyes in the links 8.

Coacting with the body member 1 of the clamp is another movable member 11, also in the form of an elongated bar, and this member is throughout the greater portion of its length of V shape, as indicated in Fig. 2, so that there may be formed on the face contiguous to the groove of the body 1 another, V groove 12. The end of this bar corresponding to the hooked end of the bar 1 is formed into a head 13 from which projects a nose 14 in a lateral direction from the bar so as to engage behind the pin 10. The other end of the bar, remote from the head 13, is formed with lateral wings 15 of suitable spread and length to engage under the lips 4 of the flanges 3.

The clamp member 11 is capable of sliding longitudinally with reference to the member 1 but is prevented from moving away therefrom to any considerable extent by the engagement of the wings 15 under the lips 4 for that end of the clamp member and by the engagement of the nose 14 against the pin 10 on the corresponding end of the clamp.

Now, when a rod 6 is inserted between the two clamp members and power is applied to the hook 2 the tendency of the clamp member 1 is to move lengthwise on the rod in the direction of pull of the hook 2. The frictional engagement of the clamp member 11 on the rod will tend to cause the same to drag and this will turn the links 8 on their pivot 9 and thus cause the clamp member 11 to approach the rod 6. The clamp member 11 will therefore be forced with a cramping action upon the rod 6 and will force the same, whatever its diameter, into the grooves 5 and 12, and the greater the strain brought to bear upon the hook 2 the more firmly will the clamping member 11 be brought into contact with the rod 6. The end of the clamping member 11 remote from the head 13 is prevented from moving away from the other member 1 of the clamp by the engagement of the lips 4 with the wings 15, and the rod is therefore grasped through the greater portion of that part of the rod engaged by the clamp so that there is a great extent of frictional engagement between the clamp and the rod, and, therefore, the clamp will grasp smooth rods with no danger of slipping therefrom and without the necessity of putting such clamping strain upon circumscribed portions of the rod as might tend to mar or injure the rod.

In practice the groove 5 is rounded and smooth so as to slide readily on the round rod 6, while the V groove 12 is roughened so so that it will grip the rod.

I claim:—

1. In a device for the purpose described, two clamp members, one movable longitudinally with reference to the other, a pivoted yoke engaging the movable member near one end thereof to draw the same toward the relatively fixed member, and means for limiting the movement of that end of the movable member remote from the end engaged by the yoke away from the corresponding end of the relatively fixed member.

2. In a device of the character described, a clamp member having a hook formed on one end and overhanging approaching flanges formed on the other end, said member having a longitudinal rounded groove, another clamp member having a head on one end and wings on the other end arranged to engage under the overhanging portions of the flanges on the first-named clamp member, and a pivoted yoke carried by the first-named clamp member and engaging the head of the second-named clamp member.

3. In a device of the character described, a clamp member composed of an elongated bar having a longitudinal groove and also having a hook formed at one end on the face remote from the groove and at the other end having flanges on each side of the groove, said flanges being formed with overhanging approaching parts, another clamp member having at one end a head formed with a projecting nose and at the other end formed with oppositely projecting wings adapted to engage under the overhanging portions of the flanges of the first-named clamp member, said second clamp member being provided with an elongated V-shaped groove matching the groove in the first-named member, and links pivotally connected to the first-named clamp member and having a connecting pin co-acting with the nose on the head end of the second-named clamp member.

4. In a device of the character described, a clamp member composed of an elongated bar having a longitudinal groove and also having a hook formed at one end on the face remote from the groove and at the other end having flanges on each side of the groove, said flanges being formed with overhanging approaching parts, another clamp member having at one end a head formed with a projecting nose and at the other end formed with oppositely projecting wings adapted to engage under the overhanging portions of the flanges of the first-named clamp member, said second clamp member being provided with an elongated V-shaped groove matching the groove in the first-named member, and links pivotally connected to the first-named clamp member and having a removable connecting pin co-acting with the nose on the head end of the second-named clamp member.

In testimony that I claim the foregoing as my own, I have hereto affixed my signature in the presence of two witnesses.

JOHN THEODORE HOVIS.

Witnesses:
   CHAS. W. HOVIS,
   W. L. CROSS.